(No Model.)
H. GALE.
HORSE HAY RAKE.
No. 290,411. Patented Dec. 18, 1883.
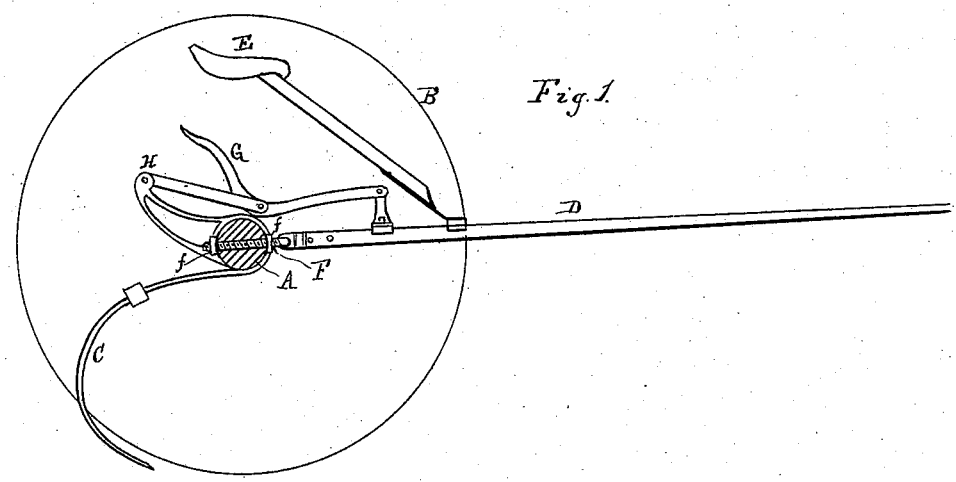
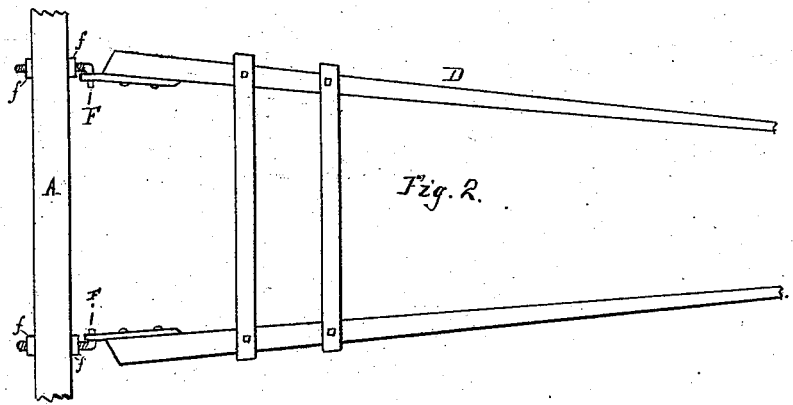
Attest:
H. F. Magee
E. Scully.
Inventor.
Horatio Gale.
By Thos. S. Sprague
Atty.

UNITED STATES PATENT OFFICE.

HORATIO GALE, OF ALBION, MICHIGAN.

HORSE HAY-RAKE.

SPECIFICATION forming part of Letters Patent No. 290,411, dated December 18, 1883.

Application filed May 15, 1883. (No model.)

*To all whom it may concern:*

Be it known that I, HORATIO GALE, of Albion, in the county of Calhoun and State of Michigan, have invented new and useful Improvements in Horse Hay-Rakes; and I hereby declare that the following is a full, clear, and exact description thereof, reference being had to the accompanying drawings, which form a part of this specification.

The invention consists in the peculiar construction and arrangement of means employed for securing the shafts by which the device is drawn to the rake-head in such a manner that the weight of the driver aids to dump the rake, and the shafts may be adjusted to or from the rake-head in order to adjust the leverage to the different weights of drivers.

Figure 1 is a side elevation of a rake provided with my improvement, and Fig. 2 is a top plan of the same.

In the accompanying drawings, A represents the rake-head, mounted upon the traction-wheels B, and provided with the rake-teeth C, of the ordinary construction.

D represents shafts, which are provided with a seat, E, so that the occupant of such seat shall sit directly over the rake-head or axle A.

F represents draw-bolts, which are inserted through the rake-head, one near each end, and in such position that the hooked ends of such draw-bolts will project inwardly and engage with the eyes or clips upon the ends of the shafts. These draw-bolts are threaded almost their entire length, and receive a nut, *f*, on each side of the rake-head, by means of which the outward or front end of such bolts may be adjusted to project in front of the rake-head to a greater or lesser degree.

G represents a lever, which is connected by means of the toggle-levers H to the rake-head and to the cross-bar of the shafts, such handle G being within easy reach of the driver upon the seat E.

As ordinarily constructed, horse hay-rakes are provided with a system of levers, by the means of which the rake is dumped for the purpose of depositing the windrow, which requires the exertion of considerable force upon the part of the driver to accomplish.

In my construction the system of toggle-levers are employed principally for the purpose of locking the rake, so that it will perform its functions as a rake, and in restoring it to such position after it has been dumped.

In practice the shafts are adjusted to or from the rake-head in such a manner that the weight of the driver upon the seat, so soon as the rake-head is unlocked by pushing or raising the lever G forward, will cause such rake-head to partially revolve and deposit the windrow. By drawing the lever back into its original position, the rake teeth are again lowered for gathering, and by the system of levers shown is locked in such position.

Should a considerably heavier person be put upon the rake to operate it than the weight to which such rake is adjusted, it will be found that as soon as the rake-head is released the same will dump with a jerk and too quickly, while the operator will necessarily have to exert a still greater force to return the rake to its original position, while if a lighter person operates the rake he will be compelled to exert considerable force, and, in fact, absolutely dump the rake by main force.

It can readily be seen that by the adjustment herein provided I can so adjust the relation between the rake-head and the shafts as to render the operation of dumping or restoring the rake much less laborious to the operator than in those of ordinary construction, for where the adjustment depends upon a series of holes in the connection, as heretofore proposed, it must be limited by said holes, whereas by my device it can be easily adjusted to suit any and all requirements.

What I claim as my invention is—

In combination with the rake-head A and shafts D of a horse-rake, the hook draw-bolts F and nuts *f*, arranged one on each side of the rake-head, by means of which said shafts can be readily adjusted to or from the rake-head, and a suitable device for locking the rake in its operating position, substantially as and for the purposes set forth.

HORATIO GALE.

Witnesses:
CHARLES J. HUNT,
C. J. ALLEN.